United States Patent
K Abraham (10) Patent No.: US 12,048,014 B2
(45) Date of Patent: Jul. 23, 2024

(54) APPARATUS FOR A TERMINAL DEVICE

(71) Applicant: Nokia Technologies Oy, Espoo (FI)

(72) Inventor: Aby K Abraham, Muvattupuzha (IN)

(73) Assignee: Nokia Technologies Oy, Espoo (FI)

( * ) Notice: Subject to any disclaimer, the term of this patent is extended or adjusted under 35 U.S.C. 154(b) by 198 days.

(21) Appl. No.: 17/199,098

(22) Filed: Mar. 11, 2021

(65) Prior Publication Data

US 2021/0368546 A1    Nov. 25, 2021

(30) Foreign Application Priority Data

May 22, 2020   (IN) .............................. 202041021637

(51) Int. Cl.
*H04W 74/0833* (2024.01)
*H04B 17/318* (2015.01)
*H04W 24/10* (2009.01)
*H04W 56/00* (2009.01)
*H04W 74/00* (2009.01)

(52) U.S. Cl.
CPC ...... *H04W 74/0833* (2013.01); *H04B 17/318* (2015.01); *H04W 24/10* (2013.01); *H04W 56/0045* (2013.01); *H04W 74/008* (2013.01)

(58) Field of Classification Search
None
See application file for complete search history.

(56) References Cited

U.S. PATENT DOCUMENTS

| | | | |
|---|---|---|---|
| 2014/0219109 A1 | 8/2014 | Shukair et al. | |
| 2019/0132882 A1* | 5/2019 | Li | H04W 74/0833 |
| 2020/0252973 A1* | 8/2020 | Zhang | H04W 74/0833 |
| 2021/0282191 A1* | 9/2021 | Chang | H04W 16/18 |
| 2023/0007686 A1* | 1/2023 | Belleschi | H04W 24/10 |

FOREIGN PATENT DOCUMENTS

| | | |
|---|---|---|
| WO | 2019/018831 A1 | 1/2019 |
| WO | 2019/108114 A1 | 6/2019 |

OTHER PUBLICATIONS

"Stage-2 running CR for 2-step RACH", 3GPP TSG-RAN WG2 Meeting #108, R2-1915889, Nokia, Nov. 18-22, 2019, pp. 1-9.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.

(Continued)

*Primary Examiner* — Kenny S Lin
*Assistant Examiner* — Rodrick Mak
(74) *Attorney, Agent, or Firm* — HARNESS, DICKEY & PIERCE, P.L.C.

(57) ABSTRACT

An apparatus, comprising at least one processor, and memory storing instructions that, when executed by the at least one processor, cause a terminal device at least to: transmit a random access information to a network device, wherein the random access information characterizes a type of at least one random access procedure performed by the terminal device and comprises a reference signal power information related to a serving cell associated with the random access procedure and/or a timing advance of a random access response.

18 Claims, 4 Drawing Sheets

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.8.0, Dec. 2019, pp. 1-134.
"RAN2-108#661 offline discussion on SON functions", 3GPP TSG-RAN WG2 #108, R2-1916419, Agenda: 6.12.1, Ericsson, Nov. 18-22, 2019, 18 pages.
"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

International Search Report and Written Opinion received for corresponding Patent Cooperation Treaty Application No. PCT/EP2021/052764, dated May 12, 2021, 12 pages.
"On Reporting Random Access-related Information", 3GPP TSG-RAN WG2 Meeting #107, Samsung, Agenda Item: 11.12.2, R2-1909210, Aug. 26-30, 2019, 3 pages.
"Discussion on RACH optimization", 3GPP TSG-RAN WG2 Meeting #107, CMCC, Agenda Item: 11.12.4, R2-1909443, Aug. 26-30, 2019, 3 pages.
"Further Logged Information in NR MDT", 3GPP TSG-RAN WG2 Meeting #108, Samsung, Agenda Item: 6.12.2, R2-1916095, Nov. 18-22, 2019, pp. 1-7.
"UE RACH failure reporting", 3GPP TSG-RAN WG2 Meeting #71, Huawei, Agenda item: 4.3.1.3, R2-104676, Aug. 23-27, 2010, 2 pages.
Office action received for corresponding European Patent Application No. 21703895.9, dated Feb. 23, 2023, 6 pages.
"RACH Report for NB-IoT SON", 3GPP TSG RAN WG2 Meeting #105bis, Nokia, Agenda item: 12.2.8, R2-1903387, Apr. 8-12, 2019, 3 pages.
European Office Action dated Feb. 13, 2024 for corresponding European Patent Application No. 21703895.9.

* cited by examiner

APPARATUS FOR A TERMINAL DEVICE

RELATED APPLICATION

This application claims priority to India Provisional Application No. 202041021637, filed on May 22, 2020, which is incorporated herein by reference in its entirety

SPECIFICATION

Field of the Disclosure

Various example embodiments relate to an apparatus for a terminal device comprising at least one processor.

Further embodiments relate to a method of operating a terminal device.

Further embodiments relate to an apparatus for a network device comprising at least one processor.

Further embodiments relate to a method of operating a network device.

BACKGROUND

Wireless communications systems may e.g. be used for wireless exchange of information between two or more entities, e.g. comprising one or more terminal devices, e.g. user equipment, and one or more network devices such as e.g. base stations.

In wireless communications, a terminal device can perform a random access (RA) procedure with a network device to obtain access to a wireless network. Conventional types of random access procedures e.g. comprise: a) four-step RA type, and b) two-step RA type. Both types of RA procedures support contention-based random access (CBRA) and contention-free random access (CFRA).

In four-step CBRA, a terminal device can start the RA procedure by sending an RA preamble to a network device. A message for transmitting the RA preamble may e.g. be referred to as "Msg1". A Physical Random Access Channel used for transmitting Msg1 may have a large cyclic prefix, to cover the entire cell range since timing advance is not available at this point. If the network device receives the RA preamble successfully, the network device may respond with a Random Access Response (RAR), which may contain at least one of: an identifier of the detected preamble, a timing advance, a Cell-Radio Network Temporary Identifier (C-RNTI), and an uplink grant for scheduling a Physical Uplink Shared Channel (PUSCH) transmission by the terminal device. A message for transmitting the RAR may be referred to as "Msg2".

Based on the uplink grant of the message Msg2, the terminal device may send a scheduled transmission to the network device, which may be referred to as "Msg3". If the network device receives the scheduled transmission, the network device may send a contention resolution message to indicate whether there was contention or whether the transmission by the terminal device was successful, which may be referred to as "Msg4".

In two-step CBRA, the number of round-trips for the RA procedure is reduced from 2 round-trips to 1. This is achieved by sending both "Msg1" and "Msg3" in a message called "MsgA" and by further combining "Msg2" and "Msg4" into a message called "MsgB". A Cyclic Prefix used for PUSCH is usually smaller than that of PRACH, so MsgA can be used only in a part of the cell. Otherwise, PUSCH transmission from MsgA may interfere with scheduled PUSCH transmissions of other UEs since timing advance is not available during MsgA transmission.

SUMMARY

The scope of protection sought for various embodiments of the disclosure is set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus comprising at least one processor, and memory storing instructions that, when executed by the at least one processor, cause a terminal device at least to: transmit a random access information to a network device, wherein the random access information characterizes a type of at least one random access procedure performed by the terminal device and comprises a reference signal power information related to a serving cell associated with the random access procedure and/or a timing advance of a random access response. In some embodiments, this may enable to collect information related to random access (RA) procedures and/or analyze and/or optimize such RA procedures and/or one or more parameters for such RA procedures.

In some embodiments, the apparatus may be an apparatus for a wireless communications system.

In some embodiments, the apparatus or its functionality, respectively, may be provided in a terminal device of the communications system, for example in a user equipment (UE).

In some embodiments, the apparatus according to the embodiments or its functionality, respectively, may be used for or within wireless communications systems, e.g. networks, based on or at least partially adhering to third generation partnership project, 3GPP, radio standards such as 4G E-UTRAN or 5G NR (fifth generation new radio) or other radio access technology. In some embodiments, the apparatus according to the embodiments or its functionality, respectively, may be used for RA (random access) procedures of 5G NR-based communications systems.

According to some embodiments, the random access information indicates whether the at least one random access procedure performed by the terminal device is a two-step random access procedure.

According to some embodiments, the instructions, when executed by the at least one processor, further cause the terminal device to include into the random access information, if the at least one random access procedure performed by the terminal device is a two-step random access procedure, at least one of the following elements: a) a number of transmissions of a message comprising a random access preamble associated with the two-step random access procedure, b) contention information indicating whether a contention was detected during the two-step random access procedure, c) fallback information indicating whether a fallback to another type of random access procedure occurred during the two-step random access procedure, d) fallback reason information indicating a reason for the fallback to another type of random access procedure during the two-step random access procedure, e) reference signal power information related to a serving cell associated with the two-step random access procedure, f) a timing advance of a random access response (RAR) (e.g., received in a fallback RAR), g) a location of the terminal device, e.g. the location of the terminal device when it has decided to use the two-step random access procedure.

According to some embodiments, the terminal device may determine if the at least one random access procedure performed by the terminal device is (or was) a two-step RA procedure, and, if so, the terminal device may include at least one of the elements a) to g) mentioned above in the RA information, e.g., additionally to the information on the type of the RA procedure.

According to some embodiments, the terminal device may determine, e.g. based on an operational state and/or on availability of data (e.g., location or position information, respectively) and/or depending on configuration (e.g., by the network or a network device) which (additional) elements a) to g) to include into the RA information.

According to some embodiments, the instructions, when executed by the at least one processor, further cause the terminal device to: select a type of random access procedure (e.g., two-step or four-step), perform at least the selected type of random access procedure, transmit the random access information.

According to some embodiments, the terminal device may select the type of random access procedure based on network configuration. According to some embodiments, and similar to 5G NR release 16, a reference signal received power (RSRP) threshold may be used by the terminal device to select between a two-step RA procedure, e.g. CBRA, and a four-step RA procedure, e.g. CBRA, e.g. at initiation of the random-access procedure.

According to some embodiments, the message MsgA of the two-step CBRA may include a preamble on a Physical RA Channel (PRACH) and a payload on a physical uplink shared channel (PUSCH). According to some embodiments, after a MsgA transmission, the terminal device may monitor for a response from the network within a configured window. If contention resolution is successful upon receiving the network response, the terminal device may end the RA procedure, while if a fallback indication is received in the MsgB, the terminal device may perform a Msg3 transmission and may monitor contention resolution. According to some embodiments, if contention resolution is not successful after Msg3 (re)transmission(s), the terminal device may go back to MsgA transmission.

According to some embodiments, for RA in a cell configured with supplementary uplink (SUL), the network may e.g. explicitly signal to the terminal device which carrier to use (uplink (UL) or SUL). According to some embodiments, the terminal device may select the SUL carrier if, and e.g., only if, the measured quality of the downlink (DL) is lower than a broadcast threshold.

According to some embodiments, the terminal device may perform the carrier selection before selecting the RA procedure, e.g. selecting between two-step and four-step random access. According to some embodiments, the RSRP threshold for two-step and four-step random access selection can be configured separately for UL and SUL. According to some embodiments, once started, all uplink transmissions of an RA procedure remain on the selected carrier.

According to some embodiments, the instructions, when executed by the at least one processor, further cause the terminal device to perform at least one of: a) at least temporarily storing the random access information, e.g. for (later) transmitting it, b) receiving an information request instructing the terminal device to transmit the random access information, or c) transmitting the random access information.

According to some embodiments, the terminal device may include the random access information within a RACH report, e.g. extending a conventional RACH report as specified in 3GPP TS 36.331, cf. e.g. the "UEInformationResponse" message. As an example, according to some embodiments, one or more components of the RA information may be included in the rack-Report-r9 SEQUENCE information element (IE).

Further embodiments relate to an apparatus comprising means for causing a terminal device, e.g. UE, at least to: transmit a random access information to a network device, wherein the random access information characterizes a type of at least one random access procedure performed by the terminal device and comprises a reference signal power information related to a serving cell associated with the random access procedure and/or a timing advance of a random access response.

According to some embodiments, the means may be configured to cause the terminal device to perform at least one further step of the embodiments explained above.

Further embodiments relate to a method of operating a terminal device, comprising: transmitting a random access information to a network device, wherein the random access information characterizes a type of at least one random access procedure performed by the terminal device and comprises a reference signal power information related to a serving cell associated with the random access procedure and/or a timing advance of a random access response.

According to some embodiments, the method may comprise at least one further step of the embodiments explained above.

Further embodiments relate to an apparatus, comprising at least one processor, and memory storing instructions that, when executed by the at least one processor, cause a network device at least to: receive a random access information, wherein the random access information characterizes a type of at least one random access procedure performed by a terminal device, e.g. related to the network device, e.g. within a cell provided by the network device, and wherein the random access information further comprises a reference signal power information related to a serving cell associated with the random access procedure and/or a timing advance of a random access response.

In some embodiments, the apparatus or its functionality, respectively, may be provided in a network device of the communications system, for example in a base station, e.g. eNodeB (eNB) or gNodeB (gNB).

In some embodiments, the apparatus or its functionality, respectively, may be provided in a network device other than a base station, e.g. a, for example central, entity, which may e.g. be configured to collect the RA information and/or to analyze and/or distribute the RA information.

In some embodiments, the apparatus according to the embodiments or its functionality, respectively, may be used for or within wireless communications systems, e.g. networks, based on or at least partially adhering to third generation partnership project, 3GPP, radio standards such as 4G E-UTRAN or 5G NR (fifth generation new radio) or other radio access technology. In some embodiments, the apparatus according to the embodiments or its functionality, respectively, may be used for RA (random access) procedures on a network side of 5G NR-based communications systems.

According to some embodiments, the random access information indicates whether the at least one random access procedure performed by the terminal device is a two-step random access procedure.

According to some embodiments, the instructions, when executed by the at least one processor, further cause the network device to transmit an information request to the terminal device instructing the terminal device to transmit the random access information.

According to some embodiments, the information request may e.g. be included in or represented by a "UEInformationRequest" message as defined in some accepted specifications.

According to some embodiments, the conventional "UEInformationRequest" message as defined in some accepted specifications may be extended to comprise an information element indicating to the terminal device whether it should send the RA information.

According to some embodiments, the instructions, when executed by the at least one processor, further cause the network device to use the random access information for at least one of: a) mapping a number of terminal devices using a specific type of random access procedure to corresponding measurement thresholds, b) adjusting measurement thresholds to control a number of terminal devices using a two-step random access procedure, c) reducing a number of terminal devices using a two-step random access procedure, e.g. if there are many failures at two-step RA procedures leading to fallback(s) to four-step RA procedures, or d) identifying a high uplink block error rate for one or more other terminal device.

According to some embodiments, the instructions, when executed by the at least one processor, further cause the network device to use the random access information for at least one of: a) a self-optimization process, b) a self-organization process, c) a self-healing process, d) optimizing at least one parameter of the two-step random access procedure, e) controlling a number of preambles for the two-step random access procedure, f) controlling a threshold at which the selection of the type of the random access procedure is detected, g) optimizing physical uplink shared channel, PUSCH, occasions, or h) determining a cause for a fallback of the terminal device from a two-step random access procedure to another type of random access procedure.

According to some embodiments, operators of the network device(s) according to some embodiments may optimize at least one of the below parameters based on the RA information obtained from the terminal device(s) according to some embodiments: a) a number of preambles to be reserved for two-step RA procedures, or b) RSRP threshold to consider for selecting a type of RA procedure (two-step or four-step), MsgA PUSCH Occasions (POs).

According to some embodiments, since the preambles reserved are separate, contention may occur for two-step RACH or four-step RA procedures separately. Similarly, if the number of MsgA-based random access attempts are low, the number of PUSCH occasions reserved may also be reduced according to some embodiments. In other words, according to some embodiments, using the knowledge provided by the terminal device in the form of the RA information, the network device may adapt one or more RA procedure-related parameters based thereon.

According to some embodiments, based on the received RA information, which may e.g. comprise level 1 (L1) RSRP and/or timing advance (TA) and/or a location of the terminal device at the random access procedure, a network device (e.g., base station or other entity, e.g. SON (self-organizing network) system) may identify if the two-step RA procedure is used outside an area where it is intended to be used. According to some embodiments, a network device may identify a high uplink (UL) block error rate (BLER) for one or more other UEs, which may be due to inter-symbol interference (ISI) and/or inter-carrier interference (ICI) from PUSCH transmissions for two-step RA procedure performed outside an area where the two-step RA procedure is intended to be used. According to some embodiments, the network device may increase an RSRP threshold for a two-step RA procedure selection to mitigate or resolve this problem.

According to some embodiments, the type of message used, i.e. the RACH scenario, may be stored in a RACH report as specified by 5G NR release 16, which may facilitate network device(s), e.g. gNB, e.g. eNB, to identify e.g. a number of bytes to be reserved in PUSCH occasion, which may also be transmitted in a first step in two-step RA procedures.

As mentioned above, according to some embodiments, MsgA PRACH (i.e., two-step) preambles are separate from the four-step RACH preambles. According to some embodiments, for the gNB to optimize the number of preambles to be set aside for two-step RACH, it is beneficial to know the number of random-access attempts using MsgA and/or whether there was any contention during e.g. two-step RACH procedure(s). This information may be provided to the gNB by means of the RA information according to some embodiments.

Further embodiments relate to an apparatus comprising means for causing a network device, e.g. a base station, e.g. gNB, or a (central) entity, at least to: receive a random access information, wherein the random access information characterizes a type of at least one random access procedure performed by a terminal device and comprises a reference signal power information related to a serving cell associated with the random access procedure and/or a timing advance of a random access response.

According to some embodiments, the means may be configured to cause the network device to perform at least one further step of the embodiments explained above.

Further embodiments relate to a method of operating a network device, comprising: receiving a random access information, wherein the random access information characterizes a type of at least one random access procedure performed by a terminal device and comprises a reference signal power information related to a serving cell associated with the random access procedure and/or a timing advance of a random access response.

According to some embodiments, the method may comprise at least one further step of the embodiments explained above.

Further embodiments relate to a system comprising at least one apparatus according to the embodiments, e.g. integrated into a terminal device such as a UE and/or a network device such as a gNB.

Some embodiments relate to a use of the apparatus according to the embodiments and/or of the method according to the embodiments and/or of the system according to the embodiments for at least one of: a) collecting information related to RA procedures, b) analyzing RA procedures, c) optimizing RA procedures, or d) optimizing one or more parameters for RA procedures.

DESCRIPTION OF SOME EMBODIMENTS

Figure 1:
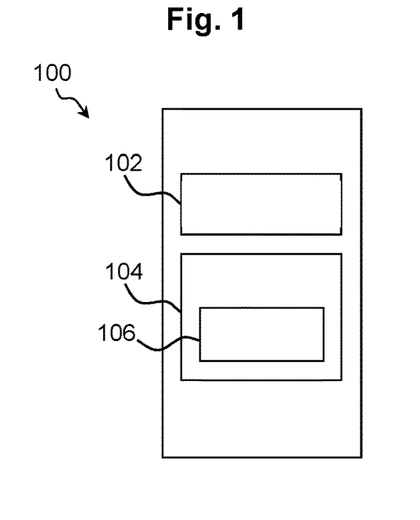
FIG. 1 schematically depicts a simplified block diagram of an apparatus according to some embodiments, FIG. 2 schematically depicts a simplified block diagram of an apparatus according to some embodiments, FIG. 3 schematically depicts a simplified block diagram of a system according to some embodiments, FIG. 4 schematically depicts a simplified flow-chart according to some embodiments, FIG. 5 schematically depicts a simplified flow-chart according to some embodiments, FIG. 6 schematically depicts a block diagram of random access information according to some embodiments, FIG. 7, 8, 9, 10, 11, 12 each schematically depicts a simplified flow-chart according to some embodiments, and FIG. 13, 14 each schematically depicts a simplified block diagram of an apparatus according to some embodiments.

Some embodiments relate to an apparatus, e.g. for a wireless communications system. FIG. 1 schematically depicts a simplified block diagram of the apparatus 100 according to some embodiments, and FIG. 4 schematically depicts a simplified flow chart of a method of operating the apparatus 100 according to some embodiments. The apparatus 100 (FIG. 1) comprises at least one processor 102, and memory 104 storing instructions 106 that, when executed by the at least one processor 102, cause a terminal device 11, cf. FIG. 3, at least to: transmit 302 (FIG. 4) a random access information RA-I to a network device 12 (FIG. 3), wherein the random access information RA-I characterizes a type of at least one random access procedure 300 (FIG. 3) performed by the terminal device 11 and comprises a reference signal power information related to a serving cell associated with the random access procedure and/or a timing advance of a random access response. In some embodiments, this may enable e.g. the network device 12 to collect information related to random access (RA) procedures and/or analyze and/or optimize such RA procedures and/or one or more parameters for such RA procedures.

Figure 3:
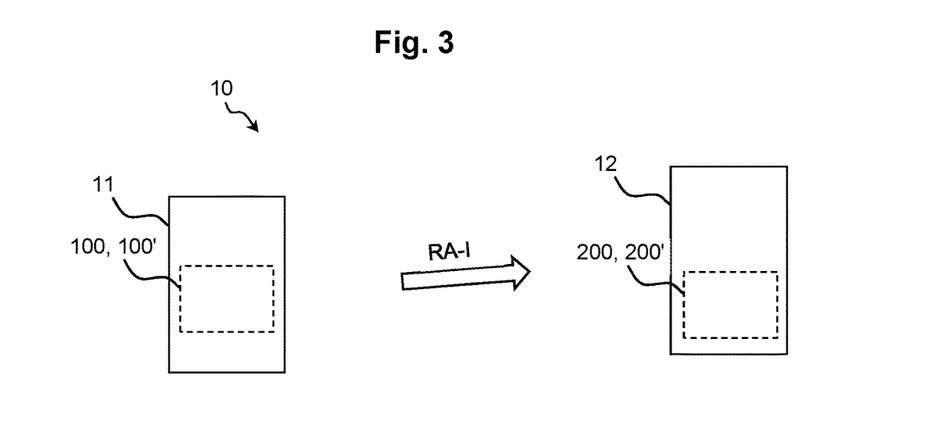
Figure 4:
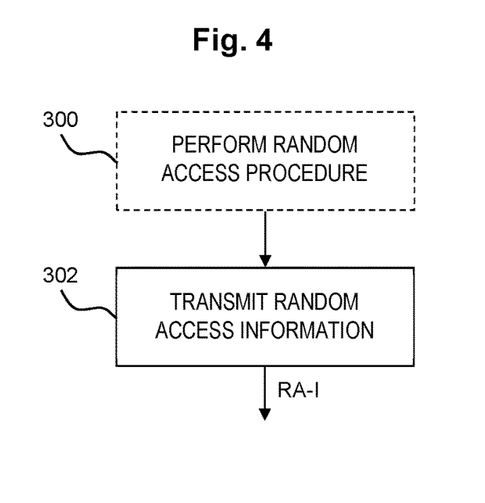

In some embodiments, the apparatus 100 (FIG. 1) may be an apparatus for a wireless communications system 10, cf. FIG. 3.

In some embodiments, the apparatus 100 or its functionality, respectively, may be provided in a terminal device 11 of the communications system 10, for example in a user equipment (UE).

In some embodiments, the apparatus 100 according to the embodiments or its functionality, respectively, may be used for or within wireless communications systems 10, e.g. networks, based on or at least partially adhering to third generation partnership project, 3GPP, radio standards such as 4G E-UTRAN or 5G NR (fifth generation new radio) or other radio access technology. In some embodiments, the apparatus 100 according to the embodiments or its functionality, respectively, may be used for RA (random access) procedures of 5G NR-based communications systems 10.

According to some embodiments, the random access information RA-I indicates whether the at least one random access procedure 300 (FIG. 4) performed by the terminal device 11 is a two-step random access procedure, i.e. comprises two steps associated with the messages MsgA, MsgB as explained above. As an example, according to some embodiments, cf. FIG. 6, the RA information RA-I may comprise at least one information element RA-TYPE indicating the type of RA procedure performed and/or whether a two-step RA procedure has been performed by the UE 11 and/or reference signal power information RA-RSPI related to a serving cell associated with the random access procedure and/or a timing advance RA-TA of a random access response.

Figure 5:
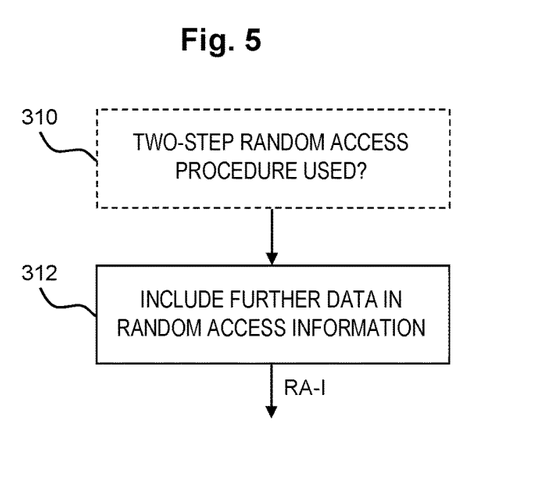
Figure 6:
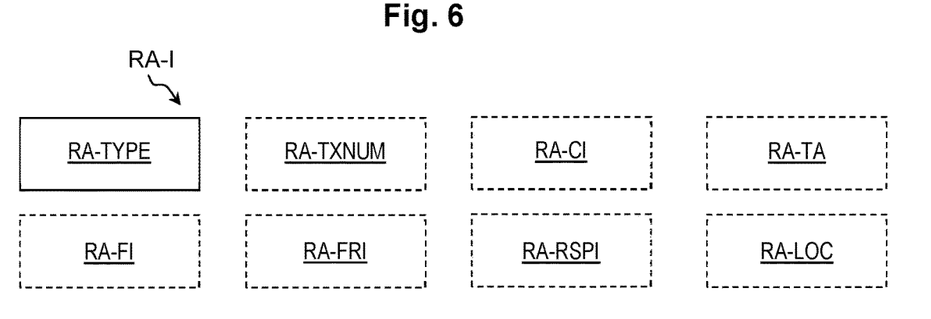

According to some embodiments, cf. FIG. 5, the instructions 106 (FIG. 1), when executed by the at least one processor 102, further cause the terminal device 11 to include 312 into the random access information RA-I, e.g. if the at least one random access procedure 300 (FIG. 4) performed by the terminal device 11 is a two-step random access procedure, at least one of the following elements, also cf. FIG. 6: a) a number RA-TXNUM of transmissions of a message (e.g., message MsgA) comprising a random access preamble associated with the two-step random access procedure, b) contention information RA-CI indicating whether a contention was detected during the two-step random access procedure, c) fallback information RA-FI indicating whether a fallback to another type of random access procedure (e.g., four-step) occurred during the two-step random access procedure, d) fallback reason information RA-FRI indicating a reason for a or the fallback to another type of random access procedure during the two-step random access procedure, e) reference signal power information RA-RSPI related to a serving cell associated with the two-step random access procedure, f) a timing advance RA-TA of a random access response, or g) a location RA-LOC of the terminal device 11, e.g. the location of the terminal device 11 when it has decided to use the two-step random access procedure.

According to some embodiments, the reference signal power information RA-RSPI may comprise at least one of RSRP, RSRQ (reference signal received quality), e.g. level 1 (L1) RSRP measurements corresponding to a downlink path loss reference signal (rather than level 3 (L3) filtered measurements).

According to some embodiments, the terminal device 11 may determine, cf. step 310 of FIG. 5, if the at least one random access procedure 300 performed by the terminal device 11 is (or was) a two-step RA procedure, and, if so, the terminal device 11 may include 312 at least one of the elements a) to g) (also cf. FIG. 6) mentioned above in the RA information RA-I, e.g., additionally to the information RA-TYPE on the type of the RA procedure 300.

According to some embodiments, the terminal device 11 may determine (e.g., also in step 312 of FIG. 5), e.g. based on an operational state and/or on availability of data (e.g., location or position information, respectively) and/or depending on configuration (e.g., by the network or a network device 12) which (additional) elements a) to g) to include into the RA information RA-I.

Figure 7:
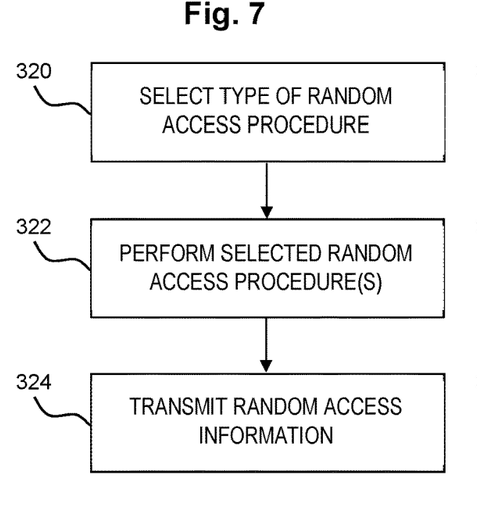

According to some embodiments, cf. FIG. 7, the instructions 106, when executed by the at least one processor 102, further cause the terminal device 11 to: select 320 a type of random access procedure (e.g., two-step or four-step) and/or perform 322 at least the selected type of random access procedure (and optionally one or more repetitions/further RA attempts, either with same or different type of RA procedure), and/or transmit 324 the random access information RA-I, e.g. to the network device 12 (FIG. 3).

According to some embodiments, the terminal device 11 may select the type RA-TYPE of random access procedure based on network configuration. According to some embodiments, and similar to 5G NR release 16, a reference signal received power (RSRP) threshold may be used by the terminal device 11 to select between a two-step RA procedure, e.g. CBRA, and a four-step RA procedure, e.g. CBRA, e.g. at initiation of the random-access procedure.

According to some embodiments, the message MsgA of the two-step CBRA may include a preamble on a Physical RA Channel (PRACH) and a payload on a physical uplink shared channel (PUSCH). According to some embodiments, after a MsgA transmission, the terminal device 11 may monitor for a response from the network within a configured window. If contention resolution is successful upon receiving the network response, the terminal device 11 may end the RA procedure, while if a fallback indication is received in the MsgB, the terminal device 11 may perform a Msg3 transmission and may monitor contention resolution. According to some embodiments, if contention resolution is not successful after Msg3 (re)transmission(s), the terminal device 11 may go back to MsgA transmission.

According to some embodiments, for RA in a cell configured with supplementary uplink (SUL), the network (e.g., via gNB 12, FIG. 3) may e.g. explicitly signal to the terminal device 11 which carrier to use (uplink (UL) or SUL). According to some embodiments, the terminal device 11 may select the SUL carrier if, and e.g., only if, the measured quality of the downlink (DL) is lower than a broadcast threshold.

According to some embodiments, the terminal device 11 may perform the carrier selection before selecting 320 (FIG. 7) the RA procedure, e.g. selecting between two-step and four-step random access. According to some embodiments, the RSRP threshold for two-step and four-step random access selection can be configured separately for UL and SUL. According to some embodiments, once started, all uplink transmissions of an RA procedure remain on the selected carrier.

Figure 8:
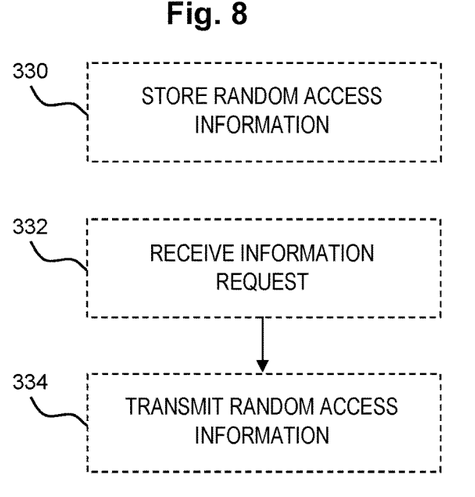

According to some embodiments, cf. FIG. 8, the instructions 106 (FIG. 1), when executed by the at least one processor 102, further cause the terminal device 11 to perform at least one of: a) at least temporarily storing 330 the random access information RA-I, e.g. for (later) transmitting it, and/or b) receiving 332 an information request INF-REQ, e.g., from the gNB 12, also cf. element e6 of FIG. 11 explained further below, instructing 334 (FIG. 8) the terminal device 11 to transmit the random access information, and/or c) transmitting 334 the random access information, e.g. to the gNB 12.

According to some embodiments, the terminal device 11 may include the random access information RA-I within a RACH report, e.g. extending a conventional RACH report as specified in some accepted specifications. As an example, according to some embodiments, one or more components of the RA information RA-I (FIG. 6) may be included in a rach-Report SEQUENCE information element (IE) as specified in some accepted specifications.

Figure 13:
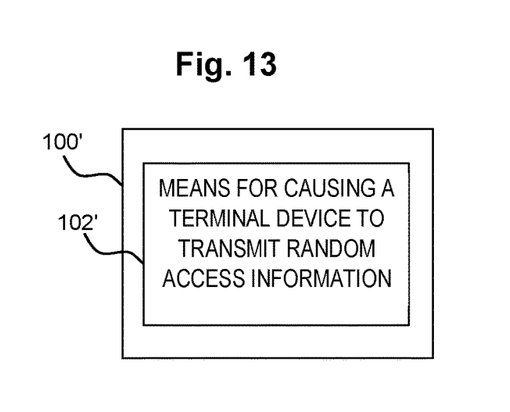

Further embodiments relate to an apparatus 100', cf. FIG. 13, comprising means 102' for causing a terminal device 11, e.g. UE, at least to: transmit 302 (FIG. 4) a random access information RA-I to a network device 12, wherein the random access information RA-I characterizes a type RA-TYPE of at least one random access procedure 300 (FIG. 4) performed by the terminal device 11.

According to some embodiments, the means 102' may be configured to cause the terminal device 11 to perform at least one further step (e.g., 300, 310, 312, . . . , 334) of the embodiments explained above or further below, also cf. e.g. FIG. 11, 12.

Further embodiments relate to a method of operating a terminal device 11, comprising: transmitting 302 (FIG. 4) a random access information RA-I to a network device 12, wherein the random access information RA-I characterizes a type of at least one random access procedure performed by the terminal device 11.

According to some embodiments, the method may comprise at least one further step (e.g., 300, 310, 312, . . . , 334) of the embodiments explained above or further below, also cf. e.g. FIG. 11, 12.

Figure 2:
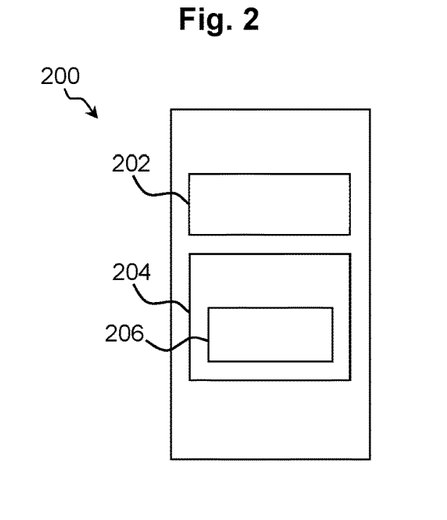
Figure 9:
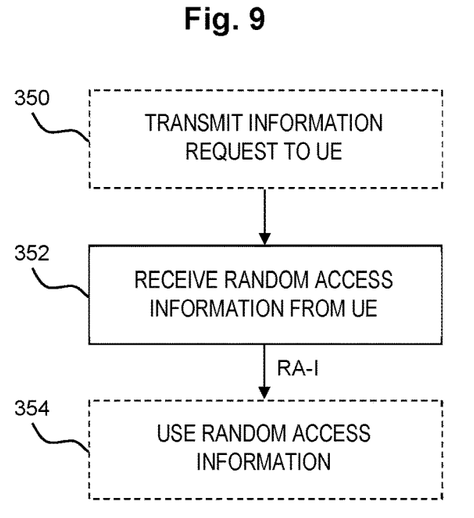

Further embodiments relate to an apparatus 200, cf. FIG. 2 and FIG. 9, comprising at least one processor 202, and memory 204 storing instructions 206 that, when executed by the at least one processor 202, cause a network device 12 at least to: receive 352 a random access information RA-I, e.g. from a terminal device 11, e.g. UE, wherein the random access information RA-I characterizes a type of at least one random access procedure 300 performed by the terminal device 11, e.g. related to the network device 12, e.g. within a cell provided by the network device 12, and/or comprises reference signal power information related to a serving cell associated with the random access procedure and/or a timing advance of a random access response.

In some embodiments, the apparatus 200 (FIG. 2) or its functionality, respectively, may be provided in a network device 12 of the communications system 10 (FIG. 3), for example in a base station, e.g. gNodeB (gNB) 12.

In some embodiments, the apparatus 200 or its functionality, respectively, may be provided in a network device other than a base station 12, e.g. a, for example central, entity (not shown), which may e.g. be configured to collect the RA information RA-I and/or to analyze and/or distribute the RA information RA-I.

In some embodiments, the apparatus 200 according to the embodiments or its functionality, respectively, may be used for or within wireless communications systems, e.g. networks, based on or at least partially adhering to third generation partnership project, 3GPP, radio standards such as 4G E-UTRAN or 5G NR (fifth generation new radio) or other radio access technology. In some embodiments, the apparatus 200 according to the embodiments or its functionality, respectively, may be used for RA (random access) procedures on a network side of 5G NR-based communications systems 10, cf. FIG. 3.

According to some embodiments, as mentioned above, the random access information RA-I indicates whether the at least one random access procedure performed by the terminal device 11 is a two-step random access procedure.

According to some embodiments, cf. FIG. 9, the instructions 206, when executed by the at least one processor 202, further cause the network device 12 to transmit 354 an information request INF-REQ (also cf. FIG. 11) to the terminal device 11 instructing the terminal device 11 to transmit the random access information RA-I, e.g. to the network device 12 (and/or to another device or entity (not shown)).

According to some embodiments, the information request INF-REQ may e.g. be included in or represented by a "UEInformationRequest" message as specified in some accepted specifications.

According to some embodiments, the conventional "UEInformationRequest" message as specified in some accepted specifications may be extended to comprise an information element indicating to the terminal device 11 whether it should send the RA information RA-I.

Figure 10:
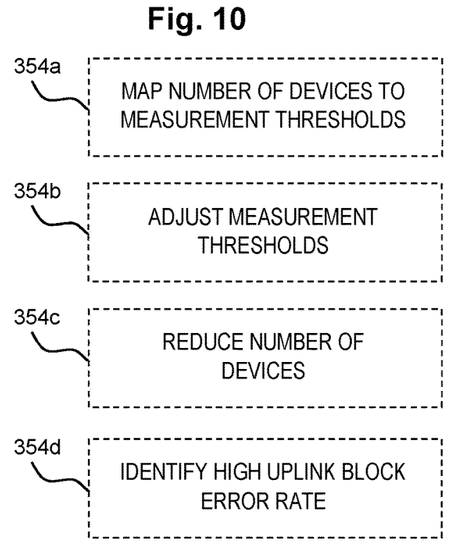

According to some embodiments, the instructions 206, when executed by the at least one processor 202, further cause the network device 12 to use 354 (FIG. 9) the random access information RA-I for at least one of, cf. FIG. 10: a) mapping 354a a number of terminal devices using a specific type of random access procedure to corresponding measurement thresholds, b) adjusting 354b measurement thresholds to control a number of terminal devices using a two-step random access procedure, c) reducing 354c a number of terminal devices using a two-step random access procedure, e.g. if there are many failures at two-step RA procedures leading to fallback(s) to four-step RA procedures, or d) identifying 354d a high uplink block error rate for one or more other terminal device.

According to some embodiments, the instructions 206, when executed by the at least one processor 202, further cause the network device 12 to use 354 (FIG. 9) the random access information RA-I for at least one of: a) a self-optimization process, b) a self-organization process, c) a self-healing process, d) optimizing at least one parameter of the two-step random access procedure, e) controlling a number of preambles for the two-step random access procedure, f) controlling a threshold at which the selection of the type of the random access procedure is detected, g) optimizing physical uplink shared channel, PUSCH, occasions, or h) determining a cause for a fallback of the terminal device from a two-step random access procedure to another type of random access procedure. According to some embodiments, identifying a high UL BLER for one or more other UEs may be due to PUSCH transmission from two-step RA procedure being used in an area where it is not intended to be used.

According to some embodiments, operators of the network device(s) 12 (FIG. 3) according to some embodiments may optimize at least one of the below parameters based on the RA information RA-I obtained from the terminal device(s) 11 according to some embodiments: a) a number of preambles to be reserved for two-step RA procedures, or b) RSRP threshold to consider for selecting a type of RA procedure (two-step or four-step), MsgA PUSCH Occasions (POs).

According to some embodiments, since the preambles reserved are separate, contention may occur for two-step RACH or four-step RA procedures separately. Similarly, if the number of MsgA-based random access attempts are low, the number of PUSCH occasions reserved may also be reduced according to some embodiments. In other words, according to some embodiments, using the knowledge provided by the terminal device 11 in the form of the RA information RA-I, the network device 12 may adapt one or more RA procedure-related parameters based thereon.

According to some embodiments, the type of message used, i.e. the RACH scenario, may be stored in a RACH report as specified by 5G NR release 16, which may facilitate network device(s), e.g. gNB, to identify e.g. a number of bytes to be reserved in PUSCH occasion, which may also be transmitted in a first step in two-step RA procedures.

As mentioned above, according to some embodiments, MsgA PRACH (i.e., two-step) preambles are separate from the four-step RACH preambles. According to some embodiments, for the gNB 12 (FIG. 3) to optimize the number of preambles to be set aside for two-step RACH, it is beneficial to know the number of random-access attempts using MsgA and/or whether there was any contention during e.g. two-step RACH procedure(s). This information may be provided to the gNB 12 by means of the RA information RA-I according to some embodiments.

According to some embodiments, based on the received RA information RA-I, which may e.g. comprise level 1 (L1) RSRP and/or timing advance (TA) and/or a location of the terminal device at the random access procedure, a network device (e.g., base station or other entity, e.g. SON (self-organizing network) system) may identify if the two-step RA procedure is used outside an area where it is intended to be used. According to some embodiments, a network device may identify a high uplink (UL) block error rate (BLER) for one or more other UEs, which may be due to inter-symbol interference (ISI) and/or inter-carrier interference (ICI) from PUSCH transmissions for two-step RA procedure performed outside an area where the two-step RA procedure is intended to be used. According to some embodiments, the network device may increase an RSRP threshold for a two-step RA procedure selection to mitigate or resolve this problem.

Figure 14:
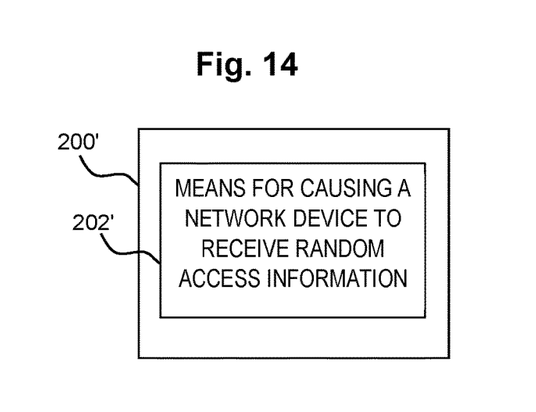

Further embodiments, cf. FIG. 14, relate to an apparatus 200' comprising means 202' for causing a network device 12, e.g. a base station, e.g. gNB, or a (central) entity, at least to: receive 352 a random access information RA-I, wherein the random access information RA-I characterizes a type of at least one random access procedure 300 performed by a terminal device 11.

According to some embodiments, the means 202' (FIG. 14) may be configured to cause the network device 12 to perform at least one further step of the embodiments explained above and/or below, cf. e.g. FIG. 11, 12.

Further embodiments relate to a method of operating a network device 12, comprising: receiving 352 a random access information RA-I, wherein the random access information RA-I characterizes a type of at least one random access procedure 300 performed by a terminal device 11.

According to some embodiments, the method may comprise at least one further step of the embodiments explained above and/or below.

Further embodiments relate to a system 10 (FIG. 3) comprising at least one apparatus 100, 100',200, 200' according to the embodiments, e.g. integrated into a terminal device 11 such as a UE and/or a network device 12 such as a gNB.

Some embodiments relate to a use of the apparatus according to the embodiments and/or of the method according to the embodiments and/or of the system according to the embodiments for at least one of: a) collecting information RA-I related to RA procedures 300, b) analyzing RA procedures 300, c) optimizing RA procedures 300, or d) optimizing one or more parameters for RA procedures 300.

Figure 11:
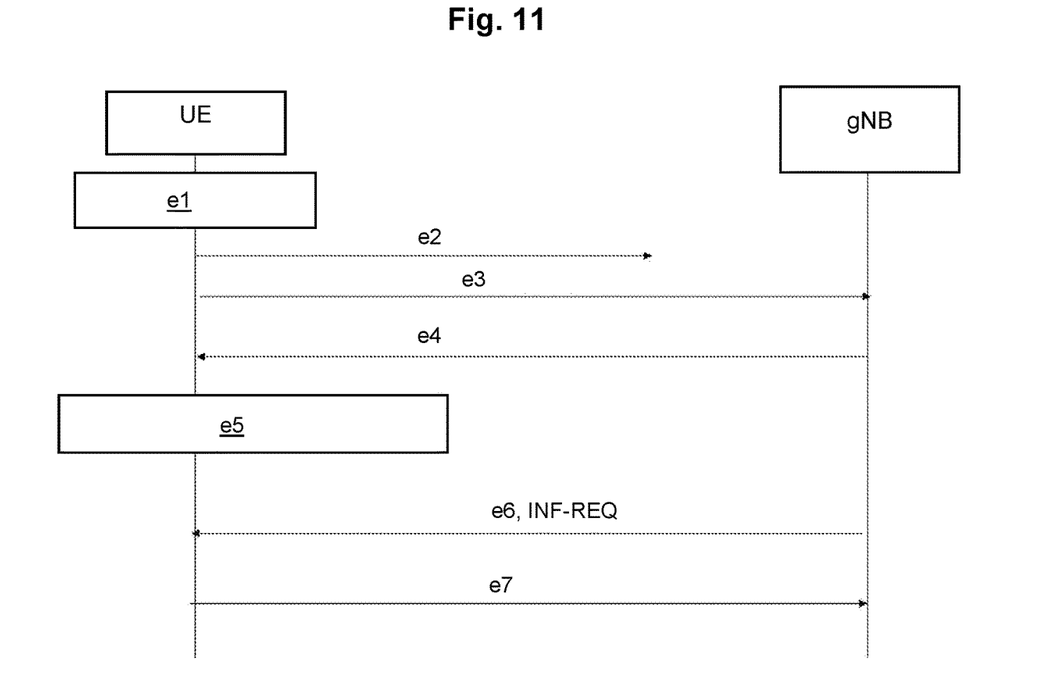

FIG. 11 schematically depicts a simplified flow-chart according to some embodiments. Element e1 symbolizes the UE 11 (also cf. FIG. 3) selecting a two-step RA procedure, e.g. based on its measurements being higher than a threshold, e.g. of the system information. The UE 11 selects a preamble corresponding to a Msg-A transmission and initiates a first random access attempt e2. The first attempt e2 is timed out, and the UE 11 repeats the RA attempt, cf. element e3, e.g. with a higher transmission power. This time the UE 11 receives a fallback request e4 from the gNB 12 (also cf. FIG. 3). Hence, the UE 11 performs a four-step RA procedure, element e5, which is successful. The UE 11 now stores e.g. both the two-step and four-step RA information RA-I, also cf. element e5. According to some embodiments, the UE 11 may provide the RA information RA-I in a RACH report e7, which may be retrieved by the gNB 12 e.g. using an UE information request e6, INF-REQ, also cf. step 350 of FIG. 9.

Figure 12:
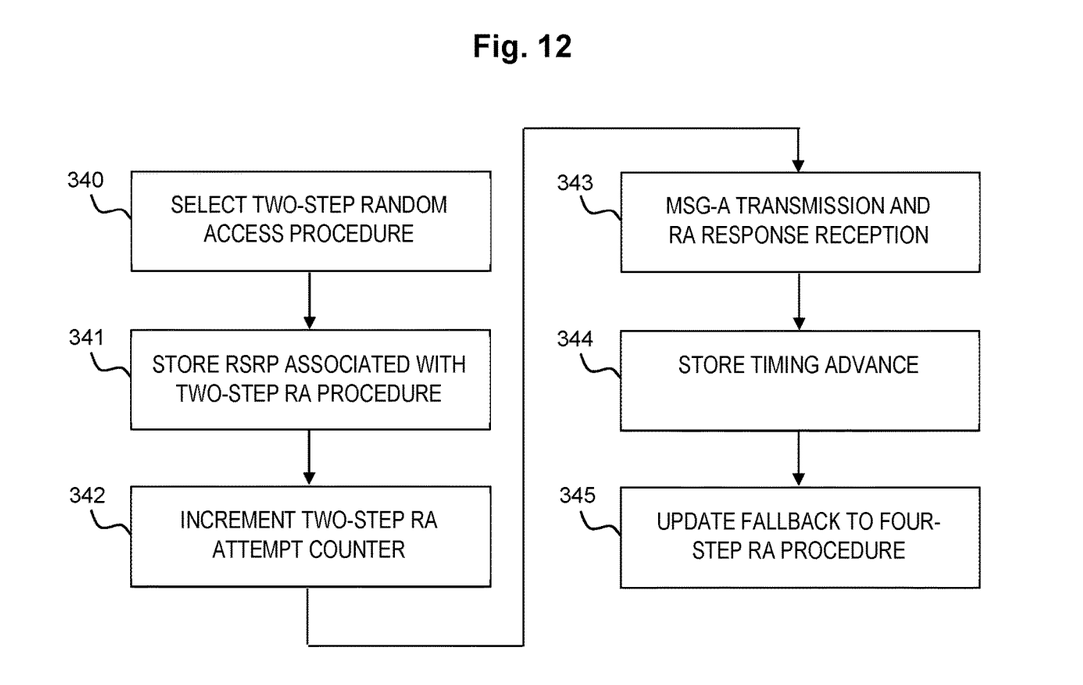

FIG. 12 schematically depicts a simplified flow-chart according to some embodiments. In step 340, the UE 11 selects a two-step RA procedure, e.g. based on the above-mentioned measurements. In step 341, the UE 11 at least temporarily stores RSRP and/or RSRQ associated with the two-step RA procedure (as well as any other component of the RA information RA-I exemplarily depicted by FIG. 6). In step 342, the UE 11 increments a two-step RA attempt counter, e.g. on corresponding RA attempts. In step 343, the UE 11 performs MsgA transmission and RA response reception. In step 344, the UE 11 stores the timing advance RA-TA, and optionally sets the contention information RA-CI if a contention is detected. In step 345, the UE 11 sets the fallback information RA-FI (and optionally also the fallback reason information RA-FRI) if a fallback from two-step RA to four-step RA occurred.

According to some exemplary embodiments, the UE 11 may update the location RA-LOC, also cf. FIG. 6. The updating of the location RA-LOC may e.g. be performed in step 340 of FIG. 12.

The principle according to the embodiments enables to provide SON procedures especially for two-step RA procedures.

According to some embodiments, based on the principle according to the embodiments, one or more conventional procedures may be changed or extended, e.g. as indicated in the following:

1> if rach-ReportReq is set to true, set the contents of the rack-Report in the UEInformationResponse message as follows:
2> if 2-step RACH was initiated
3> set twoStepRACHInitiated to true;
3> set the numberOfPreamblesSentTwoStepRACH to indicate the number of preambles sent by MAC using 2 step RACH
3> set the measAtRACHTypeSelection to indicate RSRP/RSRQ at which the 2 step RACH was selected
3> if there was fallback from 2 step to 4 step RACH
4> set the fallbackReason
3> if contention was detected during MsgA transmission
4> set contentionDetectedMsgA to true.
3> if advance was received in RAR
4> set the appliedtimingAdvance
3> if the location where 2 step RACH was selected is available
4> set the rachTypeSelectionLocation Even though some embodiments have been described above with reference to an example according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiments. It will be obvious to a person skilled in the art that, as technology advances, the concept according to the embodiments can be implemented in various ways. Further, it is clear to a person skilled in the art that the described embodiments may, but are not required to, be combined with other embodiments in various ways.

The invention claimed is:

1. An apparatus, comprising:
at least one processor; and
memory storing instructions that, when executed by the at least one processor, cause a terminal device at least to:
transmit a random access information (RA-I) to a network device, wherein the random access information (RA-I) characterizes a type of at least one random access procedure performed by the terminal device and comprises a reference signal power information (RA-RSPI) related to a serving cell associated with the random access procedure and/or a timing advance (RA-TA) of a random access response, and
detemine whether the at least one random access procedure is a two-step random access procedure,
wherein in response to a detemination that the at least one random access procedure is the two-step random access procedure, the random access information (RA-I) includes
fallback information (RA-FI) indicating whether a fallback to another type of random access procedure occurred, and
fallback reason information (RA-FRI) indicating a reason for the fallback to another type of random access procedure.

2. The apparatus according to claim 1, wherein the random access information (RA-I) indicates whether the at least one random access procedure performed by the terminal device is the two-step random access procedure.

3. The apparatus according to claim 1, wherein the instructions, when executed by the at least one processor, further cause the terminal device to:
include into the random access information (RA-I), if the at least one random access procedure performed by the terminal device is the two-step random access procedure, at least one of the following elements:
a number (RA-TXNUM) of transmissions of a message comprising a random access preamble associated with the two-step random access procedure,
contention information (RA-CI) indicating whether a contention was detected during the two-step random access procedure, or
a location (RA-LOC) of the terminal device where the type of the random access procedure is selected.

4. The apparatus according to claim 1, wherein the instructions, when executed by the at least one processor, further cause the terminal device to perform at least one of:
selecting a type of random access procedure;
performing at least the selected type of random access procedure; or
transmitting the random access information (RA-I).

5. The apparatus according to claim 1, wherein the instructions, when executed by the at least one processor, further cause the terminal device to perform at least one of:
at least temporarily storing the random access information (RA-I);
receiving an information request (INF-REQ) instructing the terminal device to transmit the random access information (RA-I); or
transmitting the random access information (RA-I).

6. The apparatus according to claim 5, wherein the information request is included in a "UEInformationRequest" message.

7. A method of operating a terminal device, comprising:
transmitting a random access information (RA-I) to a network device, wherein the random access information (RA-I) characterizes a type of at least one random access procedure performed by the terminal device, and
determining, whether the at least one random access procedure is a two-step random access procedure,
wherein in response to a determination that the at least one random access procedure is the two-step random access procedure, the random access information (RA-I) includes
a reference signal power information (RA-RSPI) related to a serving cell associated with the random access procedure and/or a timing advance (RA-TA) of a random access response,
fallback information (RA-FI) indicating whether a fallback to another type of random access procedure occurred, and
fallback reason information (RA-FRI) indicating a reason for the fallback to another type of random access procedure.

8. The method according to claim 7, wherein the random access information (RA-I) indicates whether the at least one random access procedure performed by the terminal device is the two-step random access procedure.

9. The method according to claim 7, further comprising:
including into the random access information (RA-I), if the at least one random access procedure performed by the terminal device is a two-step random access procedure, at least one of the following elements:
a number (RA-TXNUM) of transmissions of a message comprising a random access preamble associated with the two-step random access procedure,
contention information (RA-CI) indicating whether a contention was detected during the two-step random access procedure, or
a location (RA-LOC) of the terminal device where the type of the random access procedure is selected.

10. The method according to claim 7, further comprising at least one of:
selecting a type of random access procedure;
performing at least the selected type of random access procedure; or
transmitting the random access information (RA-I).

11. The method according to claim 7, further comprising at least one of:
at least temporarily storing the random access information (RA-I);
receiving an information request (INF-REQ) instructing the terminal device to transmit the random access information (RA-I); or
transmitting the random access information (RA-I).

12. The method according to claim 11, wherein the information request is included in a "UEInformationRequest" message, the "UEInformationRequest" message including an information element indicating to the terminal device whether to send the random access information (RA-I).

13. An apparatus, comprising:
at least one processor; and
memory storing instructions that, when executed by the at least one processor, cause a network device at least to:
receive a random access information (RA-I), wherein the random access information (RA-I) characterizes a type of at least one random access procedure performed by a terminal device and comprises a reference signal power information (RA-RSPI) related to a serving cell associated with the random access procedure and/or a timing advance (RA-TA) of a random access response, and
determine whether the at least on random access procedure is a two-step random access procedure,
wherein in response determination that the at least one random access procedure is the two-step random access procedure, the random access information (RA-I) includes fallback information (RA-FI) indicating whether a fallback to another type of random access procedure occurred, and
fallback reason information (RA-FRI) indicating a reason for the fallback to another type of random access procedure.

14. The apparatus according to claim 13, wherein the random access information (RA-I) indicates whether the at least one random access procedure performed by the terminal device is the two-step random access procedure.

15. The apparatus according to claim 13, wherein the instructions, when executed by the at least one processor, further cause the network device to:
transmit an information request (INF-REQ) to the terminal device instructing the terminal device to transmit the random access information (RA-I).

16. The apparatus according to claim 15, wherein the information request is included in a "UEInformationRequest" message, the "UEInformationRequest" message including an information element indicating to the terminal device whether to send the random access information (RA-I).

17. The apparatus according to claim 13, wherein the instructions, when executed by the at least one processor, further cause the network device to use the random access information (RA-I) for at least one of:
mapping a number of terminal devices using a specific type of random access procedure to corresponding measurement thresholds,
adjusting measurement thresholds to control a number of terminal devices using a two-step random access procedure,
reducing a number of terminal devices using a two-step random access procedure, or
identifying a high uplink block error rate for one or more other terminal devices.

18. The apparatus according to claim 13, wherein the instructions, when executed by the at least one processor, further cause the network device to use the random access information (RA-I) for at least one of:
a self-optimization process,
a self-organization process,
a self-healing process,
optimizing at least one parameter of the two-step random access procedure,
controlling a number of preambles for the two-step random access procedure,
controlling a threshold at which a selection of the type of the random access procedure is detected,
optimizing physical uplink shared channel, PUSCH, occasions, or
determining a cause for a fallback of the terminal device from a two-step random access procedure to another type of random access procedure.

* * * * *

UNITED STATES PATENT AND TRADEMARK OFFICE
CERTIFICATE OF CORRECTION

PATENT NO. : 12,048,014 B2
APPLICATION NO. : 17/199098
DATED : July 23, 2024
INVENTOR(S) : Aby K Abraham It is certified that error appears in the above-identified patent and that said Letters Patent is hereby corrected as shown below:

In the Claims

Claim 1 Should read:
1. An apparatus, comprising:
    at least one processor; and
    memory storing instructions that, when executed by the at least one processor, cause a terminal device at least to:
    transmit a random access information (RA-I) to a network device, wherein the random access information (RA-I) characterizes a type of at least one random access procedure performed by the terminal device and comprises a reference signal power information (RA-RSPI) related to a serving cell associated with the random access procedure and/or a timing advance (RA-TA) of a random access response, and
    determine whether the at least one random access procedure is a two-step random access procedure,
    wherein in response to a determination that the at least one random access procedure is the two-step random access procedure, the random access information (RA-I) includes
        fallback information (RA-FI) indicating whether a fallback to another type of random access procedure occurred, and
        fallback reason information (RA-FRI) indicating a reason for the fallback to another type of random access procedure.

Claim 13 Should read:
13. An apparatus, comprising:
    at least one processor; and
    memory storing instructions that, when executed by the at least one processor, cause a network device at least to:
    receive a random access information (RA-I), wherein the random access information (RA-I) characterizes a type of at least one random access procedure performed by a terminal device and comprises a reference signal power information (RA-RSPI) related to a serving cell associated with the random access procedure and/or a timing advance (RA-TA) of a random access response, and Signed and Sealed this
Twenty-seventh Day of August, 2024

Katherine Kelly Vidal
*Director of the United States Patent and Trademark Office* determine whether the at least one random access procedure is a two-step random access procedure, wherein in response to a determination that the at least one random access procedure is the two-step random access procedure, the random access information (RA-I) includes fallback information (RA-FI) indicating whether a fallback to another type of random access procedure occurred, and fallback reason information (RA-FRI) indicating a reason for the fallback to another type of random access procedure.